(12) United States Patent
Bitonti et al.

(10) Patent No.: US 9,111,001 B2
(45) Date of Patent: Aug. 18, 2015

(54) LOCAL TRANSMISSION OF POINT OF INTEREST DATA TO A GLOBAL POSITIONING SYSTEM RECEIVER

(75) Inventors: Thomas F. Bitonti, Cary, NC (US); Andrew Dwight Dingsor, Durham, NC (US); Dana Lea Price, Cary, NC (US); Dana Rieger Thalheimer, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2053 days.

(21) Appl. No.: 12/117,406

(22) Filed: May 8, 2008

(65) Prior Publication Data

US 2009/0281722 A1     Nov. 12, 2009

(51) Int. Cl.
*G06Q 30/00*  (2012.01)
*G06F 17/30*  (2006.01)
*G01C 21/36*  (2006.01)

(52) U.S. Cl.
CPC ........ *G06F 17/3087* (2013.01); *G01C 21/3679* (2013.01)

(58) Field of Classification Search
None
See application file for complete search history.

(56) References Cited

U.S. PATENT DOCUMENTS

| 6,014,090 | A | 1/2000 | Rosen et al. |
| 6,731,239 | B2 * | 5/2004 | Wall et al. ................. 342/357.64 |
| 6,879,838 | B2 * | 4/2005 | Rankin et al. .............. 455/456.6 |
| 2006/0253453 | A1 * | 11/2006 | Chmaytelli et al. ............ 707/10 |

OTHER PUBLICATIONS

Computer Organization and Archtecture, Eighth Edition, 2006; Stallings, William; pp. 118-121.*

* cited by examiner

*Primary Examiner* — Adam Tissot
(74) *Attorney, Agent, or Firm* — Winstead, P.C.

(57) ABSTRACT

A system for receiving local point of interest data is presented. The local point of interest data for a local geographic area is received by a geographic location device via a supported protocol. The local point of interest data includes information regarding one or more local points of interest in the local geographic area. The received local point of interest data is cached with existing point of interest data and maps within a cache in the geographic location device. Then, it is determined whether any time-sensitive point of interest data in the cache has expired. In response to determining that time-sensitive point of interest data in the cache has expired, the expired time-sensitive point of interest data is removed from the cache to form current local point of interest data for the local geographic area. Then, the current local point of interest data is displayed in a display device.

20 Claims, 3 Drawing Sheets

LOCAL TRANSMISSION OF POINT OF INTEREST DATA TO A GLOBAL POSITIONING SYSTEM RECEIVER

BACKGROUND OF THE INVENTION

1. Field of the Invention

The present invention relates generally to an improved data processing system and more specifically to a computer implemented method, system, and computer usable program code for local transmission of point of interest data to a global positioning system receiver.

2. Description of the Related Art

Today, travelers seeking information about local geographic areas have limited options. For example, automobile travelers may read signs along highways and interstates that may indicate the presence of gas stations, restaurants, lodgings, hospitals, educational institutions, and recreational activities in the vicinity. In addition, these signs may indicate a particular brand of gas station, restaurant, or hotel.

Also, handheld or vehicle-mounted global positioning system (GPS) receivers may provide information, which is programmed into the GPS receivers, about places and events that may be of interest to travelers. This programmed point of interest (POI) information, especially with regard to local geographic areas, may not include the newest or up-to-date information. Further, this programmed POI information may be invalid. For example, a local restaurant may have just gone out of business or a recreational activity, such as a local fair or BBQ event, may have ended. This type of local POI data, which does not make it into main POI databases, is not available to GPS receivers.

BRIEF SUMMARY OF THE INVENTION

According to one embodiment of the present invention, local point of interest data for a local geographic area is received by a geographic location device via a supported protocol. The local point of interest data includes information regarding one or more local points of interest in the local geographic area. The received local point of interest data for the local geographic area is cached with existing point of interest data and maps within a cache in the geographic location device. Then, it is determined whether any time-sensitive point of interest data in the cache has expired. In response to determining that time-sensitive point of interest data in the cache has expired, the expired time-sensitive point of interest data is removed from the cache to form current local point of interest data for the local geographic area. Then, the current local point of interest data for the local geographic area is displayed in a display device for utilization by a user.

DETAILED DESCRIPTION OF THE INVENTION

Figure 1:
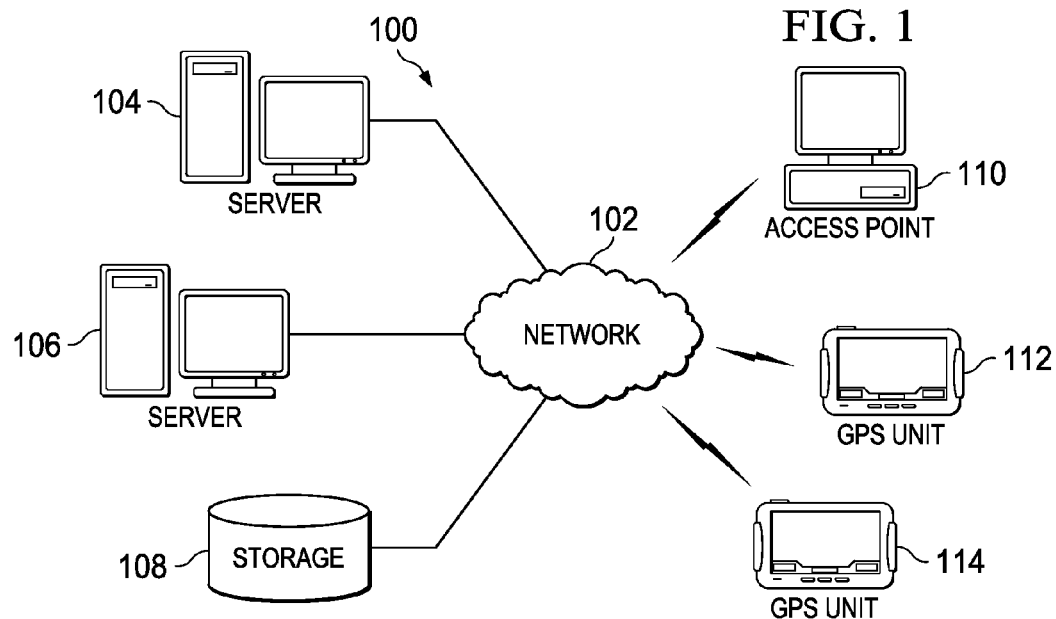
FIG. 1 is a pictorial representation of a network of data processing systems in accordance with an illustrative embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
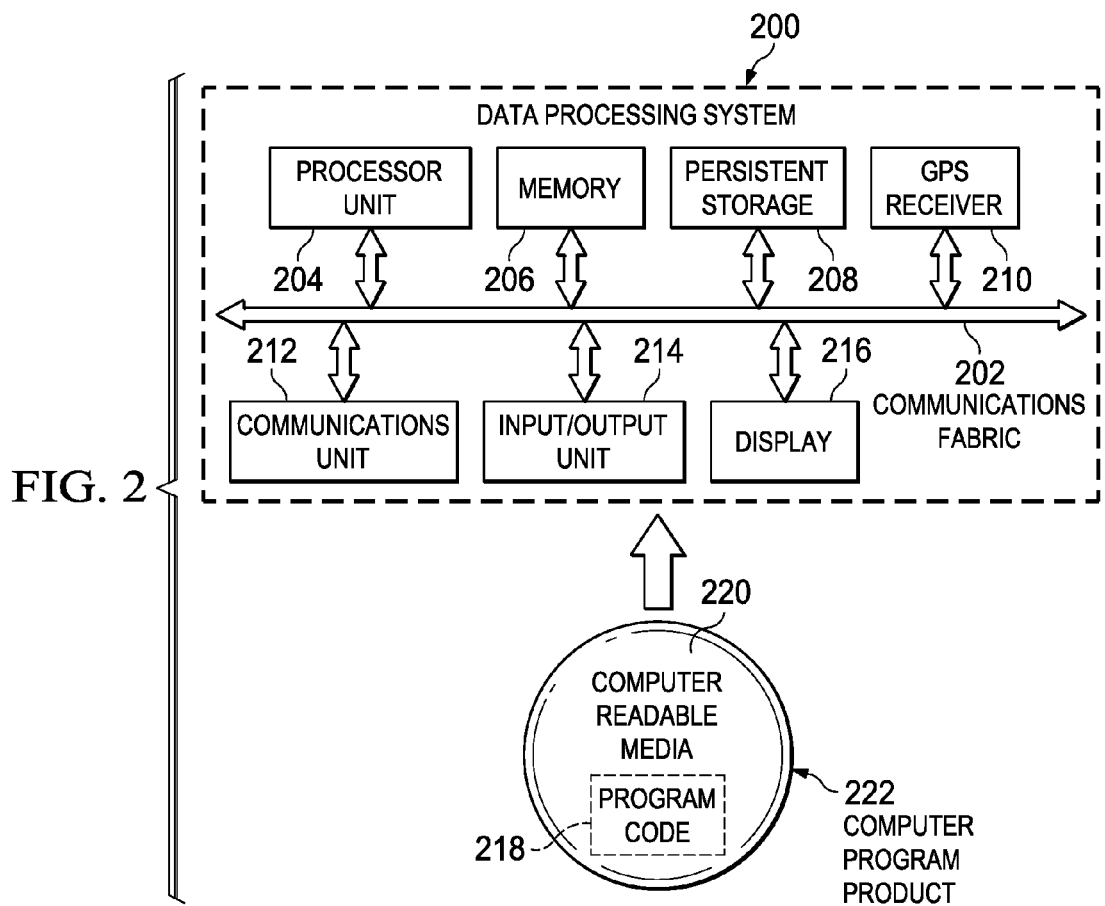
FIG. 2 is a diagram of a data processing system in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of data processing systems in which the illustrative embodiments may be implemented. Network data processing system 100 contains network 102, which is the medium used to provide communications links between various data processing systems and devices connected together within network data processing system 100. Network 102 may include connections, such as wire, wireless communication links, and/or fiber optic cables. In addition, network 102 may include a plurality of high power broadcast antennae, such as for AM, FM, and TV, and/or cellular telephone towers.

In the depicted example, server 104 and server 106 connect to network 102, along with storage unit 108. In addition, data processing systems 110, 112, and 114 connect to network 102. However, network data processing system 100 may include additional servers, data processing systems, and other devices not shown.

Data processing system 110 represents one or more personal computers and/or network computers. Data processing system 110 may serve as a wireless access point to network 102 for one or more points of interest, such as businesses, activities, and events, in a local geographic area. Data processing systems 112 and 114, which are wirelessly connected to network 102, represent a plurality of mobile GPS units that may be traveling within the local geographic area.

In the depicted example, data processing systems (i.e., GPS units) 112 and 114 receive local POI data directly from data processing system (i.e., Access Point) 110 via network 102. However, it should be noted that servers 104 and 106 may also provide data to data processing systems 110, 112, and 114. This data may, for example, be POI information, boot files, operating system images, and applications. In addition, this data may be stored in storage 108.

Network data processing system 100 may be implemented as a number of different types of networks, such as, for example, an internet, an intranet, a local area network (LAN), or a wide area network (WAN). FIG. 1 is only intended as an example, and not as an architectural limitation for the different illustrative embodiments.

With reference now to FIG. 2, a diagram of a data processing system is shown in which illustrative embodiments may be implemented. Data processing system 200 is an example of a data processing system, such as data processing system 112 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, GPS receiver 210, communications unit 212, input/output (I/O) unit 214, and display 216.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a transient basis and/or a persistent basis. Memory 206, in these examples, may, for example, be a RAM or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

GPS receiver 210 is an example of a device that receives GPS data from a GPS system. However, it should be noted that GPS receiver 210 may also represent a GPS transceiver capable of both receiving and transmitting data. In addition, GPS receiver 210 is capable of receiving other data, such as local POI information, from a plurality of different types of transmission systems, such as, for example, radio, television, cellular, and paging networks. Moreover, GPS receiver 210 is capable of incorporating this local POI data received from the different types of transmission systems into previously cached GPS data.

Communications unit 212, in these examples, provides for communications with other data processing systems or devices. In these examples, communications unit 212 is a network interface card. Communications unit 212 may provide communications through the use of either or both physical and wireless communications links.

Input/output unit 214 allows for input and output of data with other devices that may be connected to data processing system 200. For example, input/output unit 214 may provide a connection for user input through an alphanumeric keypad.

Further, input/output unit 214 may send output to, for example, a printer. Display 216 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer recordable media 220 may not be removable.

Alternatively, program code 218 may be transferred to data processing system 200 from computer readable media 220 through a communications link to communications unit 212 and/or through a connection to input/output unit 214. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments provide a computer implemented method, system, and computer usable program code for receiving local POI data. A geographic location device, such as a GPS receiver, receives the local POI data for a local geographic area via any supported protocol. Supported protocols include a plurality of different high power broadcast network protocols, such as radio broadcast protocols and television broadcast protocols, cellular telephone network protocols, wireless access point network protocols, and paging network protocols.

The local POI data includes information regarding one or more local points of interest within a local geographic area. The GPS receiver caches the received local POI data for the local geographic area with existing POI data and maps within a cache. Then, the GPS receiver determines whether any time-sensitive POI data in the cache has expired. In response to determining that time-sensitive POI data in the cache has expired, the GPS receiver removes or deletes the expired time-sensitive POI data from the cache. Then, the GPS receiver displays the current local POI data for the local geographic area in a display device for utilization by a user. In addition, the current local POI data is available for subsequent searches in the cache.

Thus, illustrative embodiments modify GPS receivers to receive additional data signals. In other words, illustrative embodiments enable GPS receivers to receive more than just satellite location data. These additional data signals include information regarding points of interest within local geographic areas. This local POI data may, for example, include gas stations, restaurants, hotels, motels, shopping malls, theme parks, fairs, parks, historical markers, landmarks, hospitals, educational institutions, research facilities, and any other type of recreational activity or event in an immediate geographic area. In addition, this local POI data may include names, addresses, location coordinates, categories, descriptions, and any applicable expiration dates for each local POI cached. Local POI categories may, for example, include restaurants, lodgings, gas stations, activities, events, and the like. GPS receivers equipped with illustrative embodiments may overlay this newly received local POI data over the GPS receivers' previously cached maps and POI information.

Further, local venues, such as community business centers, chambers of commerce, and the like, and/or one or more commercial data transmission networks, such as cellular telephone networks, paging networks, television networks, radio networks, internet networks, wireless access points, and the like, may transmit or broadcast this local POI data to GPS receivers within a localized geographic area. Therefore, processes of illustrative embodiments do not require two-way communication links. As a result, illustrative embodiments enable ad hoc transmission and reception of this locally broadcast POI data.

This local POI data may be provided as a non-profit public service, via paid advertisement, by subscription, on a pay-per-usage basis, or on any other basis or arrangement. Furthermore, two-way networks may provide local POI updates on demand. As a result, for each local geographic area, illustrative embodiments dynamically combine this received local POI data with data previously cached within the GPS receivers. Consequently, cached POI data within enabled GPS receivers will change in each local geographic area. A local geographic area may, for example, be defined by a selected broadcast distance, such as 15 miles, from a local POI or a centralized location. Alternatively, a local geographic area may be defined by a predetermined distance, such as 25 miles, from a local POI or a centralized location. Enabled GPS receivers within the receiving broadcast distance, such as, for example, 15 miles, may map this received local POI data to an existing cache of maps and other POI data.

Hence, illustrative embodiments are able to provide the most up-to-date local and time-sensitive POI data to GPS receivers within the geographic area in real time. Time-sensitive local POI data is information regarding activities and events that occur within a specified period of time. For example, a local fair may only be open for two weeks, a local BBQ cook off event may only last a weekend, and a local fruit festival may only occur during the harvest season.

Figure 3:
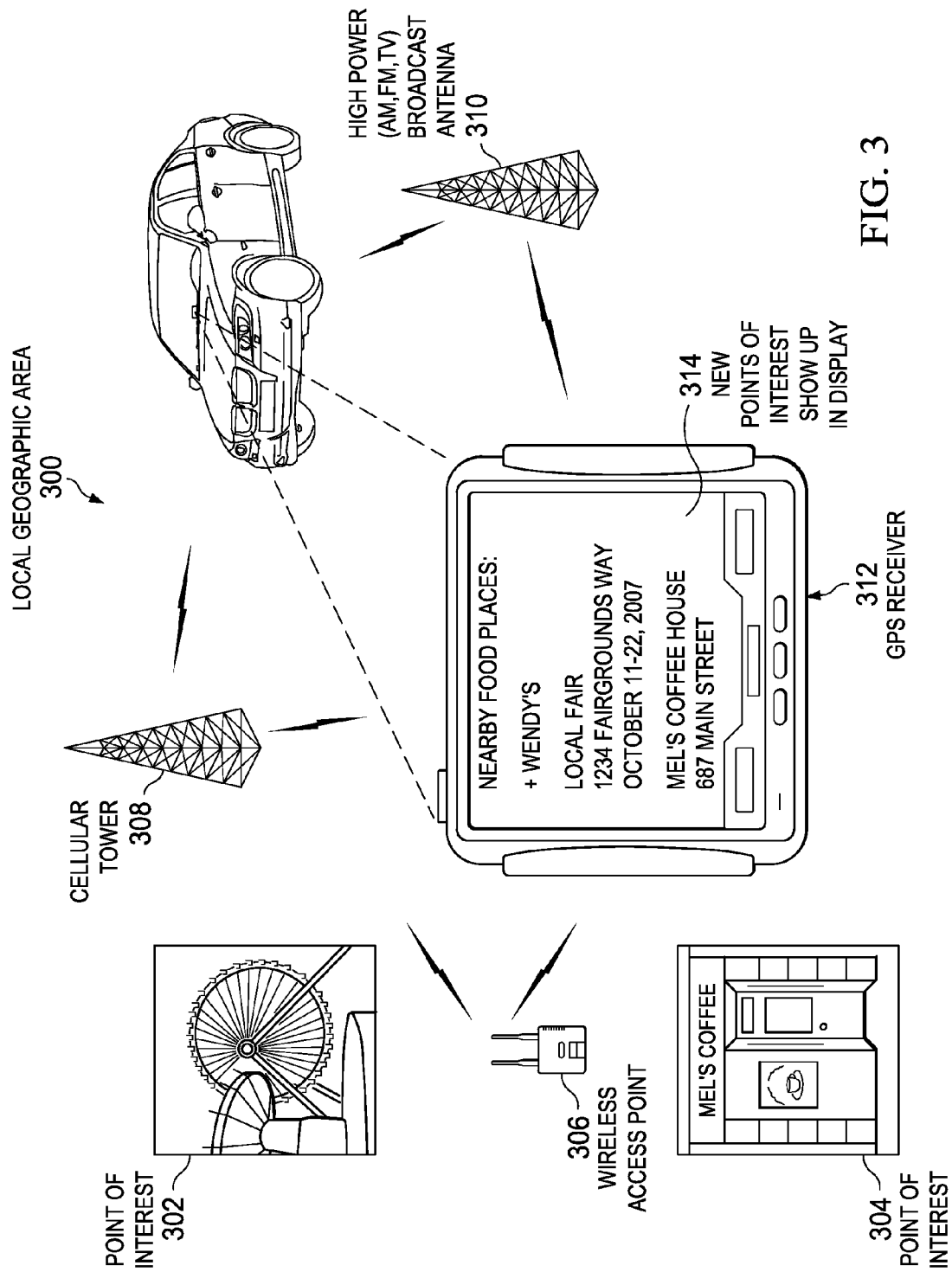
FIG. 3 is a pictorial representation of a local geographic area in accordance with an illustrative embodiment.

With reference now to FIG. 3, a pictorial representation of a local geographic area is depicted in accordance with an illustrative embodiment. Local geographic area 300 is a localized geographic area that includes POI 302, POI 304, wireless access point 306, cellular tower 308, and high power broadcast antenna 310. POI 302 and POI 304 represent a plurality of places, activities, and events that are of interest to people traveling within local geographic area 300. POI 302 may, for example, be a local fair and POI 304 may, for example, be a local coffee house.

Wireless access point 306 may, for example, be access point 110 in FIG. 1. Wireless access point 306 provides the ability for POI 302 and POI 304 to wirelessly broadcast their respective POI information to GPS receivers, such as GPS receiver 312, within local geographic area 300. Wireless access point 306 represents one or more wireless access points. In other words, POI 302 and POI 304 may share wireless access point 306 or POI 302 and POI 304 may each have their own wireless access points.

In addition, cellular tower 308 may also broadcast local POI data to GPS receiver 312. Similarly, high power broadcast antenna 310 may also broadcast local POI data to GPS receiver 312. Cellular tower 308 represents one or more cellular telephone network towers in local geographic area 300. High power broadcast antenna 310 represent one or more different types of high power data transmission networks, such as AM, FM, and TV networks, in local geographic area 300.

In this depicted example, GPS receiver 312 is mounted in a vehicle, which is traveling through local geographic area 300. Alternatively, GPS receiver 312 may be a handheld device. GPS receiver 312 includes display 314. GPS receiver 312 utilizes display 314 to output local POI data to a user. Also, GPS receiver 312 may utilize an audio device (not shown) to output local POI data in addition to, or instead of, display 314.

As GPS receiver 312 travels through local geographic area 300, GPS receiver 312 receives local POI data for POI 302 and POI 304 via wireless access point 306, cellular tower 308, and/or high power broadcast antenna 310. After receiving this local POI data, GPS receiver 312 incorporates this local POI data into existing GPS maps and other POI data. Then, GPS receiver 312 may filter and permanently remove out-of-date POI data from the cache. Afterward, GPS receiver 312 displays this received local POI data in display 314 for the user to review. In addition, this received local POI data is available in the cache for future searches by the user. In the depicted example, a nearby fast food restaurant, along with local fair POI 302 and coffee house POI 304, are displayed for the user to review in display 314. It should be noted that other information, such as addresses and event times, regarding POI 302 and POI 304 may be included in the displayed POI data.

Figure 4:
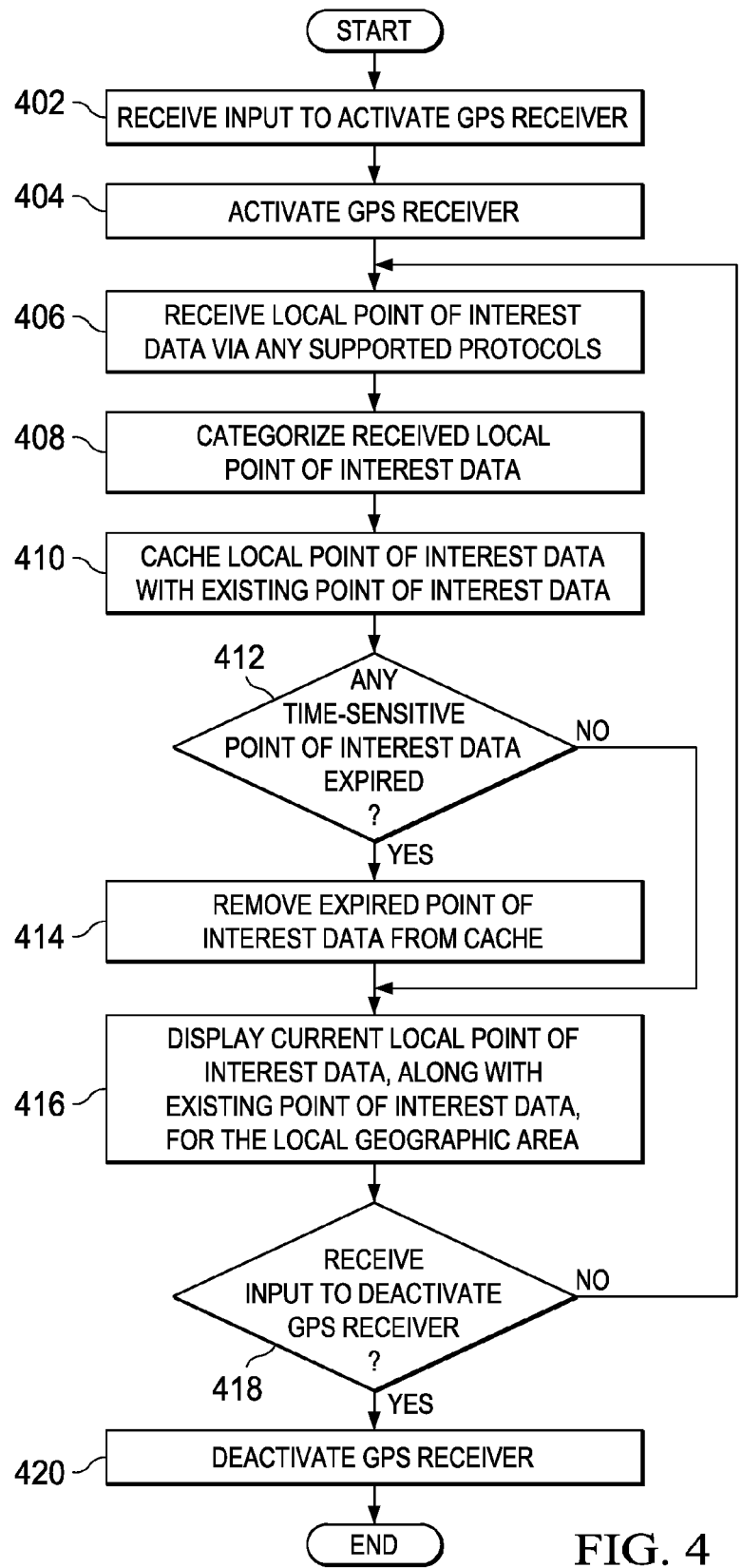
FIG. 4 is a flowchart illustrating an exemplary process for local transmission of point of interest data to a global positioning system receiver in accordance with an illustrative embodiment.

With reference now to FIG. 4, a flowchart illustrating an exemplary process for local transmission of point of interest data to a global positioning system receiver is shown in accordance with an illustrative embodiment. The process shown in FIG. 4 may be implemented in a data processing system, such data processing system 200 in FIG. 2.

The process begins when the data processing system receives an input to activate a GPS receiver, such as GPS receiver 210 in FIG. 2 (step 402). Then, the data processing system activates the GPS receiver (step 404). After the data processing system activates the GPS receiver in step 404, the GPS receiver receives local POI data for a local geographic area, such as local geographic area 300 in FIG. 3, via any supported protocol, such as, for example, FM sideband, cellular telephone data, internet, wireless access point, and television signals (step 406). Subsequent to receiving the local POI data in step 406, the GPS receiver categorizes the received local POI data into categories, such as, for example, restaurants, hotels, motels, activities, events, etc. (step 408).

Afterward, the GPS receiver caches the local POI data with existing maps and POI data in the GPS receiver (step 410). The local POI data may, for example, include a name, an address, GPS coordinates, and an expiration date, if applicable, for each local POI cached. Then, the GPS receiver makes a determination as to whether any time-sensitive POI data in the cache has expired (step 412). In other words, the GPS receiver determines whether the cached POI data is current by checking dates associated with particular activities and events. If no time-sensitive POI data in the cache has expired, no output of step 410, then the process proceeds to step 416. If time-sensitive POI data in the cache has expired, yes output of step 410, then the GPS receiver removes or deletes the expired POI data from the cache (step 414).

Subsequently, the GPS receiver displays the current local POI data, along with the existing POI data, for the local geographic area in a display device, such as display 314 in FIG. 3 (step 416). Also, it should be noted that the current local POI data is available for searches in the cache on demand. Then, the data processing system makes a determination as to whether the data processing system received an input to deactivate the GPS (step 418). If the data processing system did not receive an input to deactivate the GPS, no output of step 418, then the process returns to step 406 where the GPS receiver continues to receive local POI data via any supported protocol. If the data processing system did receive an input to deactivate the GPS receiver, yes output of step 418, then the data processing system deactivates the GPS receiver (step 420). The process terminates thereafter.

Thus, illustrative embodiments provide a computer implemented method, system, and computer program product for receiving local transmission of POI data using a GPS receiver via any supported protocol. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for receiving local point of interest data, the computer implemented method comprising:
   receiving the local point of interest data for a local geographic area by a geographic location device via a supported protocol, wherein the local point of interest data includes information regarding one or more local points of interest in the local geographic area;
   caching the received local point of interest data for the local geographic area with existing point of interest data and maps within a cache in the geographic location device;
   determining whether any time-sensitive point of interest data in the cache has expired;
   responsive to determining that time-sensitive point of interest data in the cache has expired, removing the expired time-sensitive point of interest data from the cache to form current local point of interest data for the local geographic area; and
   displaying the current local point of interest data for the local geographic area in a display device for utilization by a user.

2. The computer implemented method of claim 1, further comprising:
   categorizing the received local point of interest data into categories.

3. The computer implemented method of claim 1, wherein the supported protocol is one of a plurality of supported protocols.

4. The computer implemented method of claim 3, wherein the plurality of supported protocols includes a plurality of different high power broadcast network protocols, a cellular telephone network protocol, a wireless access point network protocol, and a paging network protocol.

5. The computer implemented method of claim 4, wherein the plurality of different high power broadcast network protocols includes a radio broadcast network protocol and a television broadcast network protocol.

6. The computer implemented method of claim 1, wherein the local point of interest data includes a name, an address, location coordinates, a description, and an expiration date if applicable, for each of the one or more local points of interest.

7. The computer implemented method of claim 1, wherein the local geographic area is defined by a selected broadcast distance for the local point of interest data.

8. The computer implemented method of claim 1, wherein the geographic location device is a global positioning system receiver.

9. The computer implemented method of claim 1, wherein the local geographic area is one of a plurality of local geographic areas, and wherein the current local point of interest data in the cache changes in each of the plurality of local geographic areas.

10. A data processing system for receiving local point of interest data, comprising:
a bus system;
a storage device connected to the bus system, wherein the storage device includes a set of instructions; and
a processing unit connected to the bus system, wherein the processing unit executes the set of instructions to receive the local point of interest data for a local geographic area via a supported protocol, wherein the local point of interest data includes information regarding one or more local points of interest in the local geographic area; cache the received local point of interest data for the local geographic area with existing point of interest data and maps within the storage device; determine whether any time-sensitive point of interest data in the storage device has expired; remove the expired time-sensitive point of interest data from the storage device to form current local point of interest data for the local geographic area in response to determining that time-sensitive point of interest data in the storage device has expired; and display the current local point of interest data for the local geographic area in a display device for utilization by a user.

11. The data processing system of claim 10, wherein the processing unit executes a further set of instructions to categorize the received local point of interest data into categories.

12. A computer program product stored in a computer usable medium having computer usable program code embodied therein for receiving local point of interest data, the computer program product comprising:
computer usable program code configured to receive the local point of interest data for a local geographic area by a geographic location device via a supported protocol, wherein the local point of interest data includes information regarding one or more local points of interest in the local geographic area;
computer usable program code configured to cache the received local point of interest data for the local geographic area with existing point of interest data and maps within a cache in the geographic location device;
computer usable program code configured to determine whether any time-sensitive point of interest data in the cache has expired;
computer usable program code configured to remove the expired time-sensitive point of interest data from the cache to form current local point of interest data for the local geographic area in response to determining that time-sensitive point of interest data in the cache has expired; and
computer usable program code configured to display the current local point of interest data for the local geographic area in a display device for utilization by a user.

13. The computer program product of claim 12, further comprising:
computer usable program code configured to categorize the received local point of interest data into categories.

14. The computer program product of claim 12, wherein the supported protocol is one of a plurality of supported protocols.

15. The computer program product of claim 14, wherein the plurality of supported protocols includes a plurality of different high power broadcast network protocols, a cellular telephone network protocol, a wireless access point network protocol, and a paging network protocol.

16. The computer program product of claim 15, wherein the plurality of different high power broadcast network protocols includes a radio broadcast network protocol and a television broadcast network protocol.

17. The computer program product of claim 12, wherein the local point of interest data includes a name, an address, location coordinates, a description, and an expiration date if applicable, for each of the one or more local points of interest.

18. The computer program product of claim 12, wherein the local geographic area is defined by a selected broadcast distance for the local point of interest data.

19. The computer program product of claim 12, wherein the geographic location device is a global positioning system receiver.

20. The computer program product of claim 12, wherein the local geographic area is one of a plurality of local geographic areas, and wherein the current local point of interest data in the cache changes in each of the plurality of local geographic areas.

* * * * *